July 1, 1941.    C. W. JOHNSON ET AL    2,247,387
ELASTIC FLUID TURBINE DIAPHRAGM SUPPORTING AND CENTERING ARRANGEMENT
Filed Jan. 25, 1940
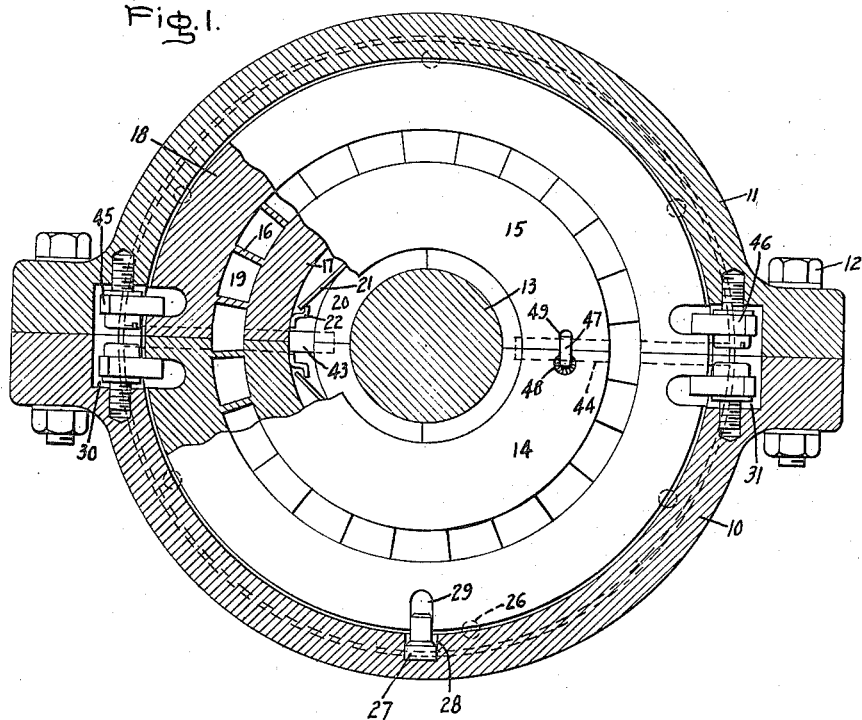
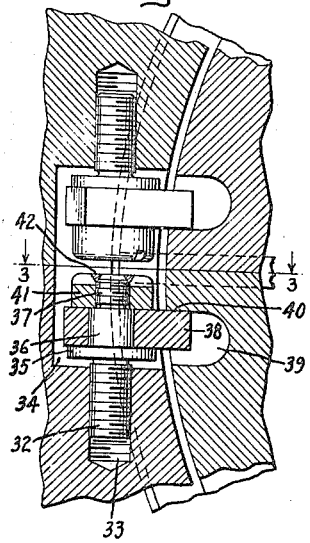
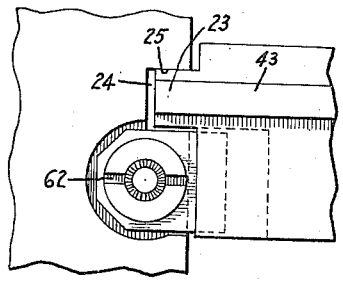
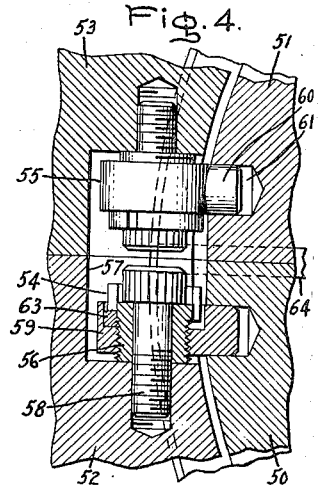
Inventors:
Carl W. Johnson,
Walter R. Wadden,
by Harry E. Dunham
Their Attorney.

Patented July 1, 1941

2,247,387

UNITED STATES PATENT OFFICE 2,247,387

ELASTIC FLUID TURBINE DIAPHRAGM SUPPORTING AND CENTERING ARRANGEMENT

Carl W. Johnson, Marblehead, and Walter R. Wadden, Swampscott, Mass., assignors to General Electric Company, a corporation of New York Application January 25, 1940, Serial No. 315,548

10 Claims. (Cl. 253—78)

The present invention relates to elastic fluid turbine diaphragm supporting and centering arrangements. Diaphragms for conducting elastic fluid from a high pressure bucket wheel to a low pressure bucket wheel usually comprise a nozzle structure forming a ring of nozzles secured between an inner disk and an outer ring. In order to assure proper cooperation between such diaphragms and bucket wheels the axes of the two must coincide, that is, with a bucket wheel rotating about the axis of the casing the axis of the diaphragm must coincide with the axis of the casing and to assure such concentricity the diaphragm must be supported and centered on the casing. In many turbine arrangements the turbine casing and the diaphragms are split into halves along horizontal planes through their respective centers or axes for the purpose of facilitating assembling and dismantling. Proper centering of this type of turbine arrangements usually requires that the dividing plane or joint of the diaphragm coincides with the dividing plane or joint formed by the casing.

The object of our invention is to provide an improved construction and arrangement for centering and supporting a turbine diaphragm on a turbine casing which is simple in design and may be produced at relatively low cost.

For a consideration of what we believe to be novel and our invention, attention is directed to the following description and the claims appended thereto in connection with the accompanying drawing.

In the drawing Fig. 1 is a sectional view of an elastic fluid turbine embodying our invention; Fig. 2 is an enlarged detail view of a part of Fig. 1; Fig. 3 is a section along line 3—3 of Fig. 2; and Fig. 4 shows a modification of our invention.

The turbine arrangement of Figs. 1 to 3 comprises a turbine casing having flanged halves 10 and 11 fastened together by bolts 12. A turbine rotor with a shaft 13 and bucket wheels, not shown, is located within the casing. In the present example the center of the casing lies within the plane of engagement between the casing halves 10 and 11. A diaphragm comprising two halves 14 and 15 is supported and centered within the casing. The center of the diaphragm halves is located in the joint between them and the two halves engage each other in a plane which in the present example coincides with the plane of engagement between the two casing halves 10 and 11.

The diaphragm has a plurality of circumferentially spaced partitions or blades 16 with inner ends secured to a disk 17 and outer ends secured to a ring 18, thus forming a ring of nozzles 19 for conducting elastic fluid to a bucket wheel, not shown. Leakage of elastic fluid along the shaft is reduced in known manner by a packing 20 which in the present instance is in the form of a ring with a plurality of segments biased into archbound relation towards the shaft by means of a plurality of flat springs 21 held on lugs 22 secured to the bore of disk 17 of the diaphragm. The diaphragm has an annular projection 23 projecting into a groove 24 formed by the casing and during operation forced into contact with a side wall 25 of such groove by the action of the pressure of the elastic fluid passed through the turbine. While the packing 20 to 22 prevents leakage of elastic fluid along the shaft, the engagement of the annular projection 23 with the side wall 25 of the casing prevents leakage of elastic fluid along the inner surface of the casing. A plurality of circumferentially spaced axial crush pins 26 secured to the diaphragm and engaging the casing limit axial movement of the diaphragm during shipping and operation.

The arrangement for centering the diaphragm within the casing in the present example includes in accordance with our invention means for centering the lower diaphragm half horizontally and other means for centering the lower diaphragm half vertically within the casing. By horizontal centering we mean maintaining parallelism between the dividing plane or joint of the diaphragm halves and that of the casing. By vertical centering we mean positioning the diaphragm so that its horizontal center line coincides with the center of the casing, that is, in the present example with the dividing plane or joint of the casing halves.

The horizontal centering of the lower diaphragm half within the casing is accomplished in known manner by a vertical dowel pin 27 positioned in an opening 28 in the lower portion of the lower casing half 10 and slidably projecting into a radial bore 29 of the lower diaphragm half 14. As the pin 29 has a vertical center line it positions the lower diaphragm half 14 horizontally so that the upper surface of the lower diaphragm half extends parallel to the dividing plane of the casing halves.

The means for vertically locating the lower half, that is, as stated above, positioning the lower diaphragm half 14 so that its upper surface coincides with the dividing plane of the casing in accordance with our invention comprise two adjustable lug arrangements 30 and 31, respectively, on opposite sides of the diaphragm. Each of these lug arrangements, as best shown in Fig. 2, has a jack screw 32 with a lower portion screwed into a bore 33 in the casing half 10 and an upper portion located within a recess 34 formed by the casing half 10. The upper portion of the jack screw forms a collar or flange 35 and a cylindrical body 36 with a threaded extension 37. A lug 38 is seated on the flange 35 and centered on the extension 37. The lug extends into a recess 39 of the lower diaphragm half 14 and engages a shoulder 40 on the diaphragm half 14 formed by the recess 39. The lug 38 is securely held in position, that is, prevented from rotation about the body 36 by a lock screw 41 secured to the extension 37 and locked thereto such as by riveting or a weld 42 between the lock screw 41 and the extension 37. The lugs 38 engaging opposite portions of the lower diaphragm half 14 serve to support the latter so that the upper face of the diaphragm half 14 lies within the dividing plane of the casing halves, that is, the lugs constitute the support proper and the vertical centering means for the lower diaphragm half 14. During assembly the jack screws 32 are screwed into the bores 33 and vertically adjusted therein until the lower diaphragm half 14 is vertically centered. Thereupon the lock screws 41 are tightened and locked to the jack screw extensions 37 by the provision of the welds 42.

The upper diaphragm half 15 is centered axially on the lower diaphragm half 14 in known manner by means including keys 43 and 44 secured to one diaphragm half and projecting into slots or keyways of the other diaphragm half. The upper diaphragm half 15 is held in engagement with the lower diaphragm half along the dividing plane by means of two adjustable lug arrangements 45 and 46 which are similar to the jack screw arrangements described above in connection with the vertical centering of the lower diaphragm half 14. When assembled the diaphragm as a whole, that is, both halves, are supported on the adjustable lug arrangements 30, 31 for the lower diaphragm half and held in engagement by the adjustable lug arrangements 45, 46 for the upper diaphragm half.

Prior to assembly of the two turbine halves the diaphragm halves of each turbine half are centered vertically by means of the corresponding adjustable lug arrangements 30, 31 and 45, 46, respectively. Thus, prior to assembly of the two halves the lug arrangements 45, 46 for the upper diaphragm half act as vertical supports for the latter on the upper casing half. The upper diaphragm half is prevented from horizontal movement in axial direction by the keys 43 and 44. Lateral movement of the upper half is prevented by a vertical key 47 secured to an opening 48 in the lower half 14 and engaging a slot 49 formed in the face of the upper half 15.

The modification of Fig. 4 comprises a diaphragm having a lower half 50 and an upper half 51 centered and supported within a turbine casing having a lower half 52 and an upper half 53. The lower diaphragm half 50 is horizontally centered by a dowel pin, not shown, corresponding to the pin 27 of Fig. 1. The lower diaphragm half 50 is supported and vertically centered by adjustable lug arrangments 54 and the upper diaphragm half 51 is supported and centered vertically by means of adjustable lug arrangements 55. The adjustable lug arrangements with regard to each half are provided on horizontally opposite portions thereof. Each adjustable lug arrangement comprises a hollow jack screw 56 seated in a recess 57 of the casing and centered by means of a bolt 58 slidably projecting through the screw 56 and secured to the casing. The hollow jack screw 56 has an outer, lower threaded portion engaging and supporting a threaded lug 59. The lug 59 has a lateral projection 60 projecting into a horizontal opening 61 in the diaphragm half. The upper portion of the hollow jack screw 56 has a slot 62 for engagement with a wrench or like tool. Rotation of the hollow jack screw 56 by such wrench or tool causes vertical positioning of the lug 59. During assembly the lugs 59 for supporting each diaphragm half are vertically positioned by turning the lug screws 56 until the centers of the diaphragm halves coincide with the centers of the casing halves, that is, in the present example, until the adjacent faces of the diaphragm halves coincide with the upper faces or planes of the corresponding turbine casing halves. After this positioning or vertical centering the adjustable lug arrangements are locked by the provision of welds 63 between the lugs 59 and the jack screws 56. In the present instance the projections 60 of the lugs are cylindrical and fit horizontal, cylindrical bores 61 in the diaphragm halves. With such an arrangement the weight of the upper diaphragm half 61 is supported substantially entirely on the adjustable lug arrangements 55 for the upper diaphragm half in contrast to the arrangement of Fig. 1 in which both diaphragm halves are supported on the adjustable lug arrangements for the lower diaphragm half. The upper diaphragm half is centered axially and laterally by means including a key 64.

Thus, with our invention we have accomplished an improved construction and arrangement for supporting and centering turbine diaphragms in a turbine casing. With regard to the specific example described above, the pin 27 constitutes a means for horizontally positioning the diaphragm, and the adjustable lug arrangements on opposite sides of the diaphragm constitute adjustable means for vertically positioning the diaphragm. In some cases it may be desirable to provide the pin in a different location. With regard to such arrangements, as well as with regard to the one described above, the radial pin in its broader aspects constitutes a means for positioning the diaphragm so that one of its diameters coincides with a diameter of the casing and the lug arrangements, which are preferably located about 90 angular degrees from opposite sides of the pin, broadly constitute adjustable means for supporting and positioning the diaphragm so that another of its diameters coincides with another diameter of the casing. If two different diameters of the diaphragm coincide with two corresponding diameters of the casing, then the centers or axes of the diaphragm and the casing must coincide.

From another viewpoint, with regard to one half of the diaphragm and the casing, a substantially semicylindrical diaphragm half is disposed within a substantially semicylindrical casing half and connected thereto and supported thereon by means positioning and centering the semicylindrical diaphragm half with reference to the semicylindrical casing half. This means include a means positioning the diaphragm half so that one of its diameters coincides with a diameter of the casing half and other means circumferentially spaced from the first named means and secured to one of the halves and engaging the other half. This other means is adjustable to permit positioning of the diaphragm half with respect to another diameter of the casing half and upon adjustment to cause another diameter of the diaphragm half to coincide with such other diameter of the casing half.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. The combination of a substantially semicylindrical turbine casing half, a substantially semicylindrical diaphragm half disposed in the casing half, and a supporting and centering arrangement connecting the halves and comprising means positioning the diaphragm half so that one of its diameters coincides with a diameter of the casing half and other means circumferentially spaced from the first named means and secured to one of the halves and projecting into and engaging walls of recesses in the other half to support the diaphragm half on the casing half, said other means being adjustable to permit positioning of the diaphragm half with respect to another diameter of the casing half and upon adjustment to cause another diameter of the diaphragm half transverse to the first mentioned diameter to coincide with such other diameter of the casing half.

2. The combination of a semicylindrical turbine casing half, a semicylindrical diaphragm half disposed in the casing half, a pin secured to one of the said halves and slidably projecting into a radial opening in the other said half to cause a diameter of the one said half to coincide with a diameter of the other said half, and means including a lug arrangement circumferentially spaced from the pin and connecting the halves to support the diaphragm half on the casing half, said means being adjustable to cause upon adjustment another diameter of one-half to coincide with another diameter of the other half.

3. Elastic fluid turbine diaphragm supporting and centering arrangement including a turbine casing member comprising upper and lower halves flanged together, a diaphragm member disposed in the casing member, one of the members having recesses on opposite sides, adjustable means including lugs secured to the other member and projecting into and engaging the walls of the recesses for normally supporting and centering the diaphragm member after assembly in the casing member, and a dowel pin circumferentially spaced from the lugs and secured to one member and slidably projecting into a radial bore in the other member.

4. Elastic fluid turbine diaphragm supporting and centering arrangement including a turbine casing comprising upper and lower halves flanged together, a diaphragm disposed in the casing and forming a radial clearance therewith, and means for centering and supporting the diaphragm on the casing, said means comprising at least two adjustable lug arrangements secured to the casing and permanently engaging the diaphragm and a dowel pin between the casing and the diaphragm and spaced from the lug arrangements.

5. Elastic fluid turbine diaphragm supporting and centering arrangement including a turbine casing comprising lower and upper halves joined along a plane through the axis of rotation, a diaphragm having lower and upper halves engaging each other and disposed within the casing, and means for permanently supporting and centering the diaphragm within the casing during operation, said means comprising a single dowel pin secured to the lower casing half for horizontally centering the lower diaphragm half and adjustable lug arrangements vertically centering and supporting both diaphragm halves on the casing.

6. Elastic fluid turbine diaphragm supporting and centering arrangement comprising a turbine casing having lower and upper halves joined along a plane through the axis of rotation, a diaphragm having lower and upper halves engaging each other and disposed within the casing, means supporting and centering the diaphragm within the casing so that the plane of engagement between the diaphragm halves coincides with the plane of engagement between the casing halves, said means comprising a vertical dowel pin horizontally centering the lower diaphragm half on the lower casing half, a lug arrangement on each side of the lower diaphragm half for vertically centering and supporting the lower diaphragm half, each lug arrangement including an adjustable jack screw secured to the casing and a lug supported on the jack screw and engaging the diaphragm.

7. Elastic fluid turbine diaphragm supporting and centering arrangement comprising a turbine casing having lower and upper halves joined along a plane through the axis of rotation, a diaphragm having lower and upper halves engaging each other and disposed within the casing, means supporting and centering the diaphragm within the casing so that the plane of engagement between the diaphragm halves coincides with the plane of engagement between the casing halves, said means comprising a vertical dowel pin horizontally centering the lower diaphragm half on the lower casing half, a lug arrangement on each side of the lower diaphragm half for vertically centering and supporting the lower diaphragm half, each lug arrangement including an adjustable jack screw secured to the casing and a lug supported on the jack screw and engaging the diaphragm, and adjustable means vertically centering the upper diaphragm half on the upper casing half prior to assembly and to maintain engagement between the diaphragm halves subsequent to assembly.

8. Elastic fluid turbine diaphragm supporting and centering arrangement comprising a turbine casing having lower and upper halves joined along a plane through the axis of rotation, a diaphragm having lower and upper halves engaging each other and disposed within the casing, means supporting and centering the diaphragm within the casing so that the plane of engagement between the diaphragm halves coincides with the plane of engagement between the casing halves, said means comprising a vertical dowel pin horizontally centering the lower diaphragm half on the lower casing half, a lug arrangement on each side of the lower diaphragm half for vertically centering and supporting the lower diaphragm half, each lug arrangement including an adjustable jack screw secured to the casing and a lug supported on the jack screw and engaging the diaphragm, and an adjustable lug arrangement on each side of the upper diaphragm half for vertically centering the upper diaphragm half on the upper casing prior to assembly and to maintain engagement between the two diaphragm halves subsequent to assembly.

9. Adjustable lug arrangement for centering and supporting turbine diaphragms on turbine casings comprising a jack screw having a screw portion for connection to a turbine casing, a flanged body formed on the jack screw, a lug centered on the flanged body, and a lock screw securing the lug to the jack screw.

10. Adjustable lug arrangement for centering and supporting turbine diaphragms on turbine casings comprisings a hollow jack screw, a bolt for securing the jack screw to a turbine casing, and a lug threaded onto the jack screw and having a lateral cylindrical extension for engaging a bore in a diaphragm.

CARL W. JOHNSON.
WALTER R. WADDEN.